(12) United States Patent
Lee et al.

(10) Patent No.: US 8,244,408 B2
(45) Date of Patent: Aug. 14, 2012

(54) METHOD TO ASSESS RISK ASSOCIATED WITH OPERATING AN AUTONOMIC VEHICLE CONTROL SYSTEM

(75) Inventors: Jin-Woo Lee, Rochester Hills, MI (US); Jeremy A. Salinger, Southfield, MI (US); Xingping Chen, Warren, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 671 days.

(21) Appl. No.: 12/400,029

(22) Filed: Mar. 9, 2009

(65) Prior Publication Data

US 2010/0228419 A1 Sep. 9, 2010

(51) Int. Cl.
*B60W 30/095* (2012.01)
*G08G 1/16* (2006.01)

(52) U.S. Cl. ............ 700/301; 701/23; 701/119; 342/71; 180/169

(58) Field of Classification Search ............ 701/23, 701/25–27, 117–119, 300, 301; 340/425.5, 340/435
See application file for complete search history.

(56) References Cited

U.S. PATENT DOCUMENTS

| | | | | |
|---|---|---|---|---|
| 5,249,157 A * | 9/1993 | Taylor | ......................... | 340/903 |
| 5,521,579 A * | 5/1996 | Bernhard | ..................... | 340/438 |
| 6,026,347 A * | 2/2000 | Schuster | ..................... | 701/301 |
| 6,269,308 B1 * | 7/2001 | Kodaka et al. | ............... | 701/301 |
| 6,317,692 B2 * | 11/2001 | Kodaka et al. | ............... | 701/301 |
| 6,317,693 B2 * | 11/2001 | Kodaka et al. | ............... | 701/301 |
| 6,442,484 B1 * | 8/2002 | Miller et al. | ................. | 701/301 |
| 6,470,272 B2 * | 10/2002 | Cong et al. | ..................... | 701/301 |
| 6,510,388 B1 * | 1/2003 | Sporrong et al. | ............. | 701/301 |
| 6,675,094 B2 * | 1/2004 | Russell et al. | ................ | 701/301 |
| 6,801,843 B2 * | 10/2004 | Rao et al. | ........................ | 701/45 |
| 6,873,911 B2 * | 3/2005 | Nishira et al. | ............... | 701/301 |
| 6,882,287 B2 * | 4/2005 | Schofield | ...................... | 340/903 |
| 6,882,915 B2 * | 4/2005 | Yamamura et al. | ............ | 701/45 |
| 6,898,528 B2 * | 5/2005 | Zorka et al. | ................... | 701/301 |
| 7,034,668 B2 * | 4/2006 | Engelman et al. | ............ | 340/435 |
| 7,069,146 B2 * | 6/2006 | Yamamura et al. | .......... | 701/301 |
| 7,124,027 B1 * | 10/2006 | Ernst et al. | ................... | 701/301 |
| 7,205,904 B2 * | 4/2007 | Schofield | ...................... | 340/903 |
| 7,233,848 B2 * | 6/2007 | Braeuchle et al. | ............ | 701/36 |
| 7,355,524 B2 * | 4/2008 | Schofield | ...................... | 340/903 |
| 7,363,140 B2 * | 4/2008 | Ewerhart et al. | ................ | 701/96 |
| 7,418,372 B2 * | 8/2008 | Nishira et al. | ................... | 703/2 |
| 7,515,056 B2 * | 4/2009 | Knoop et al. | ................. | 340/576 |

(Continued)

FOREIGN PATENT DOCUMENTS
WO WO2009007843 * 1/2009

OTHER PUBLICATIONS

Freyer et al., ACC with Enhanced Situation Awareness to Reduce Behavior Adaptations in Lane Change Situations, Jun. 2007, Proceedings of the 2007 IEEE Intelligent Vehicles Symposium, pp. 999-1004.*

(Continued)

*Primary Examiner* — Thomas G. Black
*Assistant Examiner* — Lindsay M Browder

(57) ABSTRACT

A vehicle is configured to execute an autonomic lane change maneuver and is equipped with a spatial monitoring system. Each of a plurality of objects located proximate to the vehicle is monitored. Locations of each of the objects are predicted relative to a projected trajectory of the vehicle. A collision risk level between the vehicle and each of the objects is assessed.

12 Claims, 7 Drawing Sheets

U.S. PATENT DOCUMENTS

| | | | | |
|---|---|---|---|---|
| 7,579,942 | B2* | 8/2009 | Kalik | 340/435 |
| 7,778,776 | B2* | 8/2010 | Goto et al. | 701/301 |
| 7,788,027 | B2* | 8/2010 | Jones | 701/207 |
| 7,831,391 | B2* | 11/2010 | Greene et al. | 701/301 |
| 7,881,868 | B2* | 2/2011 | Greene et al. | 701/301 |
| 7,893,819 | B2* | 2/2011 | Pfeiffer et al. | 340/435 |
| 8,112,225 | B2* | 2/2012 | Eidehall et al. | 701/301 |
| 2003/0055563 | A1* | 3/2003 | Jonas Lars et al. | 701/301 |
| 2005/0015203 | A1* | 1/2005 | Nishira | 701/301 |
| 2005/0187713 | A1* | 8/2005 | Yamamura et al. | 701/301 |
| 2007/0027597 | A1* | 2/2007 | Breuel et al. | 701/41 |
| 2008/0065328 | A1* | 3/2008 | Eidehall et al. | 701/301 |
| 2008/0312831 | A1* | 12/2008 | Greene et al. | 701/301 |
| 2009/0037088 | A1* | 2/2009 | Taguchi | 701/117 |
| 2009/0192710 | A1* | 7/2009 | Eidehall et al. | 701/301 |
| 2009/0319113 | A1 | 12/2009 | Lee | |
| 2010/0082195 | A1 | 4/2010 | Lee et al. | |
| 2010/0121576 | A1* | 5/2010 | Aso et al. | 701/301 |
| 2010/0131142 | A1 | 5/2010 | Deng et al. | |
| 2010/0228417 | A1 | 9/2010 | Lee et al. | |
| 2010/0228420 | A1 | 9/2010 | Lee | |
| 2011/0137562 | A1* | 6/2011 | Taguchi | 701/301 |

OTHER PUBLICATIONS

Kaempchen et al., IMM Object Tracking for High Dynamic Driving Maneuvers, Jun. 2004, Proceedings of the 2004 IEEE Intelligent Vehicles Symposium, pp. 825-830.*

Agate et al., Autonomous Safety Decision-Making in Intelligent Robotic Systems in the Uncertain Environments, May 2008, Annual Meeting of the North American Fuzzy Information Processing Society 2008 (NAFIPS '08), pp. 1-6.*

Hatipoglu et al., Automated Lane Change Controller Design, Mar. 2003, IEEE Transactions on Intelligent Transportation Systems, vol. 4, No. 1, pp. 13-22.*

Mukai et al., Model Predictive Control for Lane Change Decision Assist System Using Hybrid System Representation, Oct. 2006, SICE-ICASE International Joint Conference 2006, pp. 5120-5125.*

Amditis et al., Multiple-Sensor-Collision Avoidance System for Automotive Applications Using an IMM Approach for Obstacle Tracking, 2002, Proceedings of the Fifth International Conference on Information Fusion, vol. 2, pp. 812-817.*

* cited by examiner

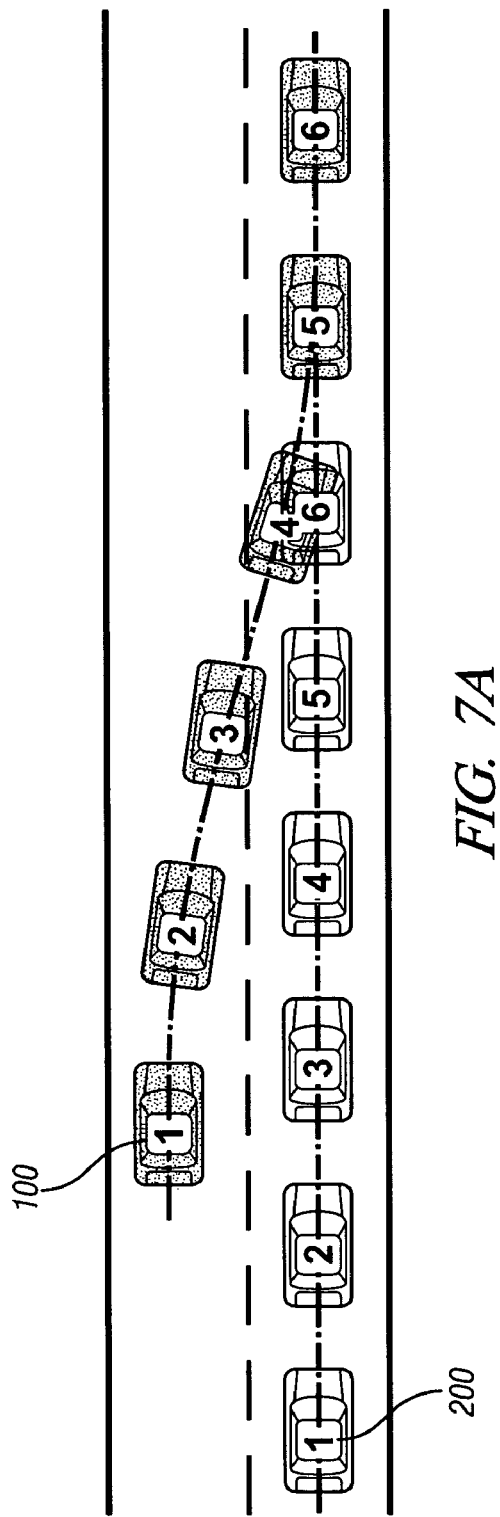
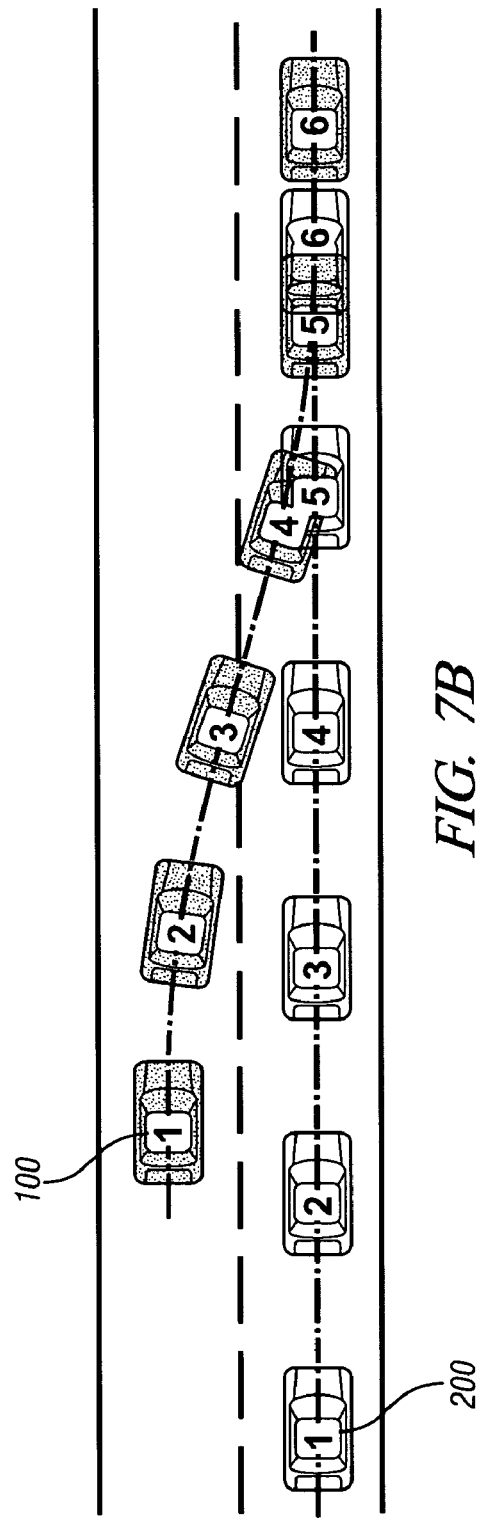
FIG. 7A
FIG. 7B

METHOD TO ASSESS RISK ASSOCIATED WITH OPERATING AN AUTONOMIC VEHICLE CONTROL SYSTEM

TECHNICAL FIELD

This disclosure is related to autonomic control systems for vehicles.

BACKGROUND

The statements in this section merely provide background information related to the present disclosure and may not constitute prior art.

Known ground vehicles use autonomic control systems to control vehicle operation. For example, vehicles use cruise control systems to maintain a travel speed of the vehicle at an operator-selected speed. Further, vehicles use adaptive cruise control systems to control speed based on both the operator-selected speed and the presence of and distance to another vehicle in a projected travel path, for example, another vehicle in the current lane of the subject vehicle. Exemplary vehicle detection systems used by adaptive cruise control systems include radar detection devices and lidar detection devices to detect the position and speed of other vehicles within the projected travel path of the subject vehicle.

Known vehicle systems include autonomic vehicle control systems that include maneuvering capabilities. Known autonomic vehicle control systems include travel path and speed control capabilities.

An example of an autonomic control system having maneuvering capability is an autonomic lane-change system. Known autonomic lane-change systems include on-vehicle monitoring systems to detect object vehicles in a current lane of the subject vehicle and object vehicles in lanes adjacent to and in proximity to the subject vehicle. Known vehicle detection systems include radar detection devices and lidar detection devices to detect the position and speed of the object vehicles. The autonomic lane-change system includes a human-machine interface device to receive commands from the vehicle operator and actuators to automatically steer the subject vehicle to change vehicle trajectory in response to the commands. Operation of the autonomic lane-change system includes a vehicle operator commanding activation of the autonomic lane-change system through the human-machine interface device, thereby indicating a desire to change the driving lane of the subject vehicle. When the autonomic lane-change system is activated, the autonomic lane-change system monitors adjacent travel lanes and operates the steering system of the subject vehicle to maneuver the subject vehicle into the adjacent lane.

A collision risk with a proximate object, e.g., an object vehicle, may increase during an autonomic lane change maneuver. Issues related to efficacy of operating an autonomic lane change system include signal latency, sensor accuracy and precision and computational efficiency, thus affecting an ability of a system to detect and assess proximate object(s).

SUMMARY

A subject vehicle is configured to execute an autonomic lane change maneuver and is equipped with a spatial monitoring system. A method for assessing a risk of collision associated with operation of the subject vehicle includes monitoring each of a plurality of object vehicles located proximate to the subject vehicle, predicting locations of each of the object vehicles relative to a projected trajectory of the subject vehicle at future time-steps, and assessing a collision risk level between the subject vehicle and each of the object vehicles at the future time-steps.

BRIEF DESCRIPTION OF THE DRAWINGS

One or more embodiments will now be described, by way of example, with reference to the accompanying drawings, in which:

FIGS. 7A and 7B are schematic diagrams, in accordance with the present disclosure.

DETAILED DESCRIPTION

Figure 1:
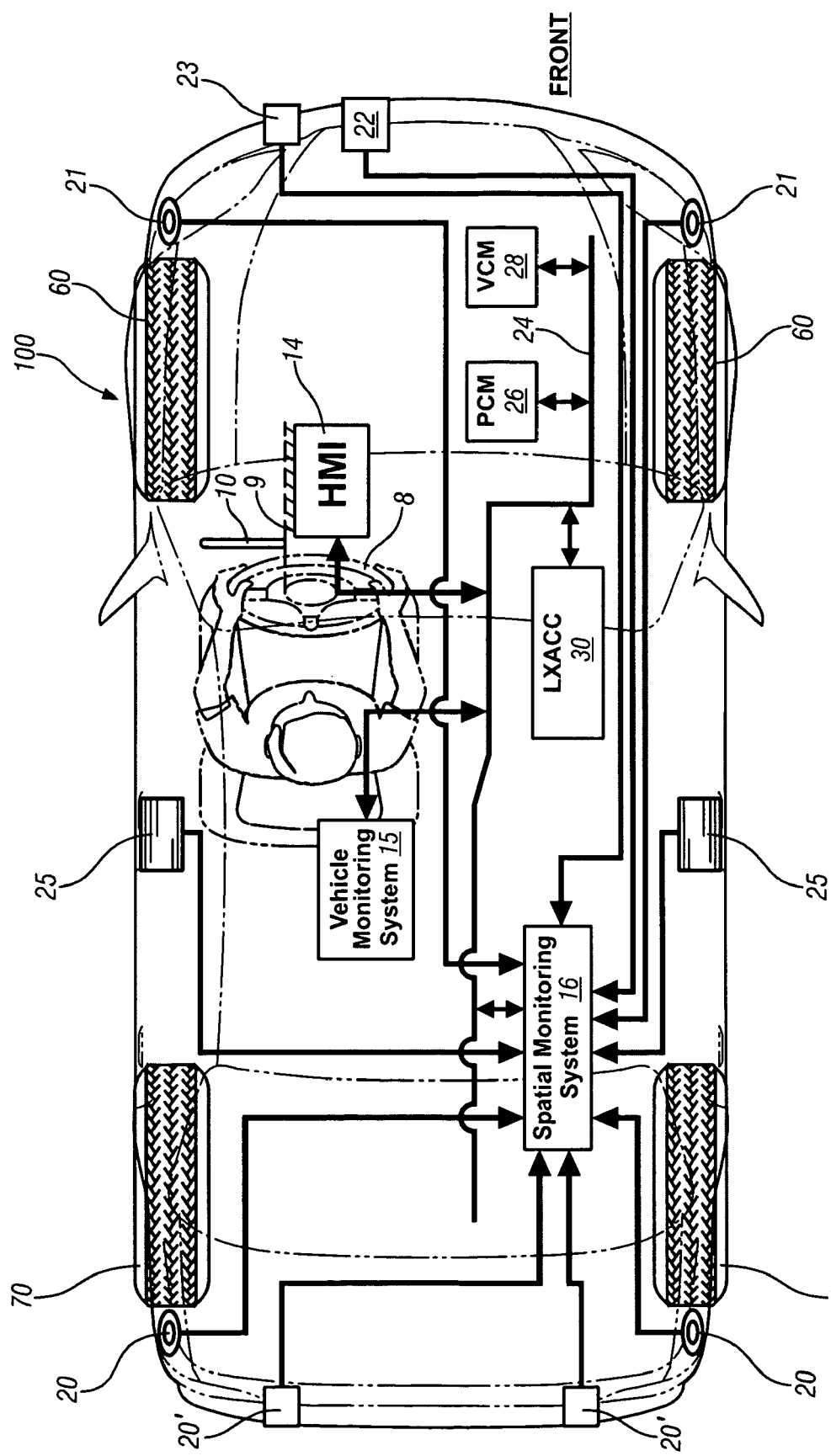
FIGS. 1 and 2 are schematic depictions of a vehicle system, in accordance with the present disclosure.

Referring now to the drawings, wherein the showings are for the purpose of illustrating certain exemplary embodiments only and not for the purpose of limiting the same, FIG. 1 schematically shows a vehicle 100 illustrative of the concepts described herein. The subject vehicle 100 comprises a four-wheel passenger vehicle with steerable front wheels 60 and fixed rear wheels 70, although the concepts described herein apply to vehicles that are steerable using the front and/or the rear wheels. The subject vehicle 100 includes a spatial monitoring system 16 and a vehicle monitoring system 15. The subject vehicle 100 is controlled using a powertrain control module (PCM) 26, a vehicle control module (VCM) 28, and an autonomic control system comprising a lane change adaptive cruise control (LXACC) system 30. The spatial monitoring system 16, vehicle monitoring system 15, powertrain control module 26, vehicle control module 28, and the LXACC system 30 preferably communicate therebetween using a high-speed local area network communications bus 24. The spatial monitoring system 16, vehicle monitoring system 15, powertrain control module 26, vehicle control module 28, and the LXACC system 30 of the subject vehicle 100 are shown as discrete elements for ease of description. It should be appreciated that the functions described and performed by the discrete elements may be executed using one or more devices, e.g., implemented as algorithmic code, predetermined calibrations, hardware, and/or application-specific integrated circuitry (ASIC).

The spatial monitoring system 16 comprises a control module signally connected to sensing devices operative to detect and generate digital images representing remote objects proximate to the subject vehicle 100. A remote object is said to be proximate to the subject vehicle 100 when the remote object can be detected by one or more of the sensing devices. The spatial monitoring system 16 preferably determines a linear range, relative speed, and trajectory of each proximate remote object and communicates such information to the LXACC system 30. The sensing devices are situated on the subject vehicle 100, and include front corner sensors 21, rear corner sensors 20, rear side sensors 20', side sensors 25, and front radar sensor 22, and a camera 23 in one embodiment, although the disclosure is not so limited. Preferably the camera 23 comprises a monochrome vision camera used for detecting forward lane markings. The front radar sensor 22 preferably comprises a long-range radar device for object detection in front of the subject vehicle 100. The front radar sensor 22 preferably detects objects at a distance up to 200 m with a narrow field of view angle of around 15° in one embodiment. Due to the narrow field of view angle, the long range radar may not detect all objects in the front of the subject vehicle 100. The front corner sensors 21 preferably comprise short-range radar devices to assist in monitoring the region in front of the subject vehicle 100, each having a 60° field of view angle and 40 m detection range in one embodiment. The side sensors 25, rear corner sensors 20 and rear side sensors 20' preferably comprise short-range radar devices to assist in monitoring oncoming traffic beside and behind the subject vehicle 100, each having a 60° field of view angle and 40 m detection range in one embodiment. Placement of the aforementioned sensors permits the spatial monitoring system 16 to monitor traffic flow including proximate object vehicles and other objects around the subject vehicle 100.

Alternatively, the sensing devices can comprise object-locating sensing devices comprising range sensors, such as Frequency Modulated Continuous Wave (FM-CW) radars, pulse and Frequency Shift Keying (FSK) radars, and lidar devices, and ultrasonic devices which rely upon effects such as Doppler-effect measurements to locate forward objects. The possible object-locating devices include charged-coupled devices (CCD) or complementary metal oxide semiconductor (CMOS) video image sensors, and other known camera/video image processors which utilize digital photographic methods to 'view' forward objects including object vehicle(s). Such sensing systems are employed for detecting and locating objects in automotive applications and are useable with systems including adaptive cruise control, collision avoidance, pre-crash preparation, and side-object detection.

The sensing devices are preferably positioned within the subject vehicle 100 in relatively unobstructed positions. It is also appreciated that each of these sensors provides an estimate of actual location or condition of an object, wherein said estimate includes an estimated position and standard deviation. As such, sensory detection and measurement of object locations and conditions are typically referred to as "estimates." It is further appreciated that the characteristics of these sensors are complementary, in that some are more reliable in estimating certain parameters than others. Sensors can have different operating ranges and angular coverages capable of estimating different parameters within their operating ranges. For example, radar sensors can usually estimate range, range rate and azimuth location of an object, but are not normally robust in estimating the extent of a detected object. A camera with vision processor is more robust in estimating a shape and azimuth position of the object, but is less efficient at estimating the range and range rate of an object. Scanning type lidar sensors perform efficiently and accurately with respect to estimating range, and azimuth position, but typically cannot estimate range rate, and are therefore not as accurate with respect to new object acquisition/recognition. Ultrasonic sensors are capable of estimating range but are generally incapable of estimating or computing range rate and azimuth position. Further, it is appreciated that the performance of each sensor technology is affected by differing environmental conditions. Thus, some sensors present parametric variances during operation, although overlapping coverage areas of the sensors create opportunities for sensor data fusion.

The vehicle monitoring system 15 monitors vehicle operation and communicates the monitored vehicle information to the communications bus 24. Monitored information preferably includes vehicle parameters including, e.g., vehicle speed, steering angle of the steerable wheels 60, and yaw rate from a rate gyro device (not shown). The vehicle operation can be monitored by a single control module as shown, or by a plurality of control modules. The vehicle monitoring system 15 preferably includes a plurality of chassis monitoring sensing systems or devices operative to monitor vehicle speed, steering angle and yaw rate, none of which are shown. The vehicle monitoring system 15 generates signals that can be monitored by the LXACC system 30 and other vehicle control systems for vehicle control and operation. The measured yaw rate is combined with steering angle measurements to estimate the vehicle states, lateral speed in particular. The exemplary vehicle system may also include a global position sensing (GPS) system.

The powertrain control module (PCM) 26 is signally and operatively connected to a vehicle powertrain (not shown), and executes control schemes to control operation of an engine, a transmission and other torque machines, none of which are shown, to transmit tractive torque to the vehicle wheels in response to vehicle operating conditions and operator inputs. The powertrain control module 26 is shown as a single control module, but can include a plurality of control module devices operative to control various powertrain actuators, including the engine, transmission, torque machines, wheel motors, and other elements of a hybrid powertrain system, none of which are shown.

The vehicle control module (VCM) 28 is signally and operatively connected to a plurality of vehicle operating systems and executes control schemes to control operation thereof. The vehicle operating systems preferably include braking, stability control, and steering systems. The vehicle operating systems can also include other systems, e.g., HVAC, entertainment systems, communications systems, and anti-theft systems. The vehicle control module 28 is shown as single control module, but can include a plurality of control module devices operative to monitor systems and control various vehicle actuators.

The vehicle steering system preferably includes an electrical power steering system (EPS) coupled with an active front steering system (not shown) to augment or supplant operator input through a steering wheel 8 by controlling steering angle of the steerable wheels 60 during execution of an autonomic maneuver including a lane change maneuver. An exemplary active front steering system permits primary steering operation by the vehicle operator including augmenting steering wheel angle control when necessary to achieve a preferred steering angle and/or vehicle yaw angle. It is appreciated that the control methods described herein are applicable with modifications to vehicle steering control systems such as electrical power steering, four/rear wheel steering systems, and direct yaw control systems which control traction of each wheel to generate a yaw motion.

The passenger compartment of the vehicle 100 includes an operator position including the steering wheel 8 mounted on a steering column 9. An input device 10 is preferably mechanically mounted on the steering column 9 and signally connects to a human-machine interface (HMI) control module 14. Alternatively, the input device 10 can be mechanically mounted proximate to the steering column 9 in a location that is convenient to the vehicle operator. The input device 10, shown herein as a stalk projecting from column 9, comprises an interface device by which the vehicle operator can command vehicle operation in an autonomic control mode, e.g., the LXACC system 30. The input device 10 preferably has control features and a location that is used by present turn-signal activation systems. Alternatively, other input devices, such as levers, switches, buttons, and voice recognition input devices can be used in place of or in addition to the input device 10.

The HMI control module 14 monitors operator requests and provides information to the operator including status of vehicle systems, service and maintenance information, and alerts commanding operator action. The HMI control module 14 signally connects to the communications bus 24 allowing communications with other control modules in the vehicle 100. With regard to the LXACC system 30, the HMI control module 14 is configured to monitor a signal output from the input device 10, discern an activation signal based upon the signal output from the input device 10, and communicate the activation signal to the communications bus 24. The HMI control module 14 is configured to monitor operator inputs to the steering wheel 8, and an accelerator pedal and a brake pedal, neither of which are shown. It is appreciated that other HMI devices and systems can include vehicle LCD displays, audio feedback, haptic seats, and associated human response mechanisms in the form of knobs, buttons, and audio response mechanisms.

Figure 2:
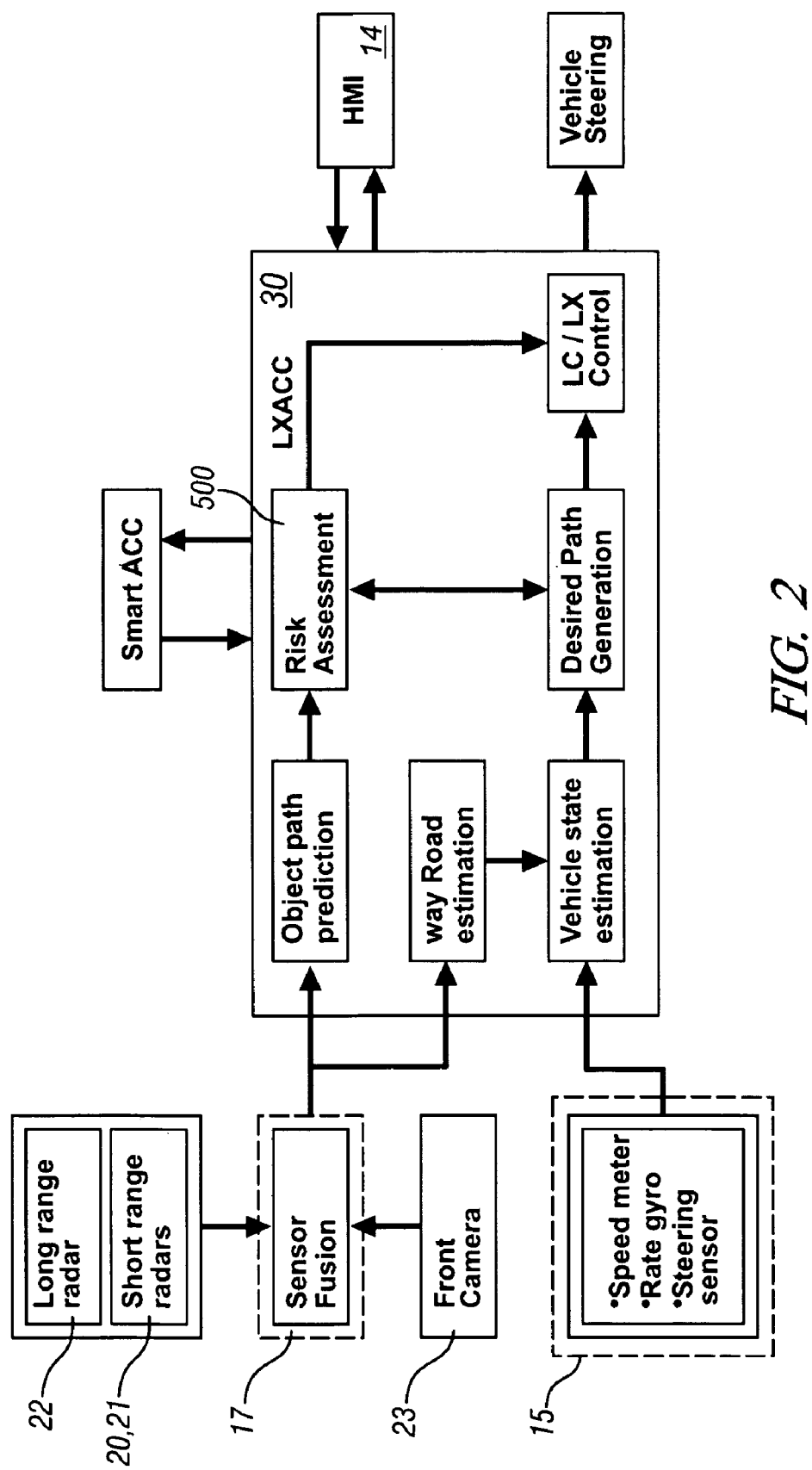

FIG. 2 shows an exemplary control architecture for an autonomic control system including the LXACC system 30 that can be incorporated into the subject vehicle 100 described with reference to FIG. 1. The LXACC system 30 controls operation of the vehicle 100 in an autonomic control mode to execute a vehicle maneuver in response to an operator command without direct operator input to the primary vehicle controls, e.g., the steering wheel and accelerator and brake pedals. The LXACC system 30 executes in the autonomic control mode by monitoring inputs from the spatial monitoring system 16 and generating control signals that are transmitted to the powertrain control module 26 and the vehicle control module 28 to control speed and trajectory of the vehicle 100 to execute the desired vehicle maneuver.

The control architecture for the LXACC system 30 includes core elements for monitoring and controlling the subject vehicle 100 during ongoing operation. The LXACC system 30 executes in an autonomic lane change mode when it receives an activation signal from the input device 10 via the HMI control module 14.

Overall, the LXACC system 30 monitors signal outputs from the remote sensing and detection devices signally connected to the spatial monitoring system 16. A fusion module (Sensor Fusion) 17 is executed as an element of the spatial monitoring system 16, comprising algorithmic code to process the signal outputs generated using the sensing devices 20, 20', 21, 22 and 23 to generate fused objects comprising digital images representing remote object(s) including object vehicle(s) 200 proximate to the subject vehicle 100. The LXACC system 30 uses the fused objects to project a path, or trajectory, for the remote object(s) (Object path prediction), e.g., each of one or more object vehicle(s) 200 that are proximate to the subject vehicle 100. The LXACC system 30 executes a collision risk assessment scheme 500 for each monitored object (Risk Assessment). The LXACC system 30 decides whether to execute and/or complete a command lane change maneuver based upon the collision risk assessment, which is communicated to an autonomic control module, in this embodiment comprising a lane change control module (LC/LX Control). The lane change control module of the LXACC system 30 sends control signals to a steering control module (Vehicle Steering) to control vehicle steering and to an autonomic cruise control (Smart ACC) to control vehicle forward motion, including braking and acceleration. The LXACC system 30 can also alert the vehicle operator via the human-machine interface control module 14 subsequent to collision risk assessment.

The spatial monitoring system 16 monitors lane marks and detects neighboring traffic using the aforementioned remote sensing and detection devices. The collision risk assessment scheme 500 of the LXACC system 30 performs collision risk assessment including lateral motion control. The remote sensing and detection devices transmit data to the fusion module for filtering and post-processing. After the post-processing, the fusion module estimates the roadway profile (Roadway Estimation) with reference to the lateral offset of the object vehicle and heading angle of the vehicle 100 referenced to the current lane. On-board sensors coupled to the vehicle monitoring system 15, including inertial sensors such as a rate gyro, a vehicle speed meter, and a steering angle sensor can be combined with the information from the fusion module to enhance the roadway profile prediction and the vehicle motion state estimation, including, e.g., lateral speed, yaw rate, lateral offset, and heading angle.

The fusion module 17 generates fused objects comprising the digital images representing the remote objects proximate to the subject vehicle 100 using information from the forward vision camera, and the long range and short range radars of the spatial monitoring system 16. The information can be in the form of the estimated range, range rate and azimuth location. The sensor fusion system groups data for each of the objects including object vehicle(s) 200, tracks them, and reports the linear range, relative speed, and trajectory as a present longitudinal distance x longitudinal relative speed u and longitudinal relative acceleration $a_x$, relative to an XY-coordinate system oriented and referenced to the central axis of the subject vehicle 100 with the X axis parallel to the longitudinal trajectory thereof. The fusion module 17 integrates inputs from various sensing devices and generates a fused object list for each of the object vehicle(s) 200 and other remote objects. The fused object list comprises a data estimate of relative location and trajectory of a remote object relative to the subject vehicle 100, in the form of a fused object list including position (x,y), velocity (Vx, Vy), object width, object type and lane, and a degree of confidence in the data estimate.

In operation the spatial monitoring system 16 determines position, speed and trajectory of other vehicles and objects to identify a clearing sufficient to permit the vehicle 100 to maneuver into an adjacent travel lane. When there is a sufficient clearing for entry of the vehicle 100 into the adjacent travel lane, the LXACC system 30 sends a signal indicating lane change availability to the LXACC system 30 via the communications bus 24. Further, the spatial monitoring system 16 can send signals indicative of speed and location of other vehicles, for example, an object vehicle 200 in the same travel lane directly in front of the vehicle 100 that can be used to control the speed of the vehicle 100 as part of an adaptive cruise control system.

Figure 3:
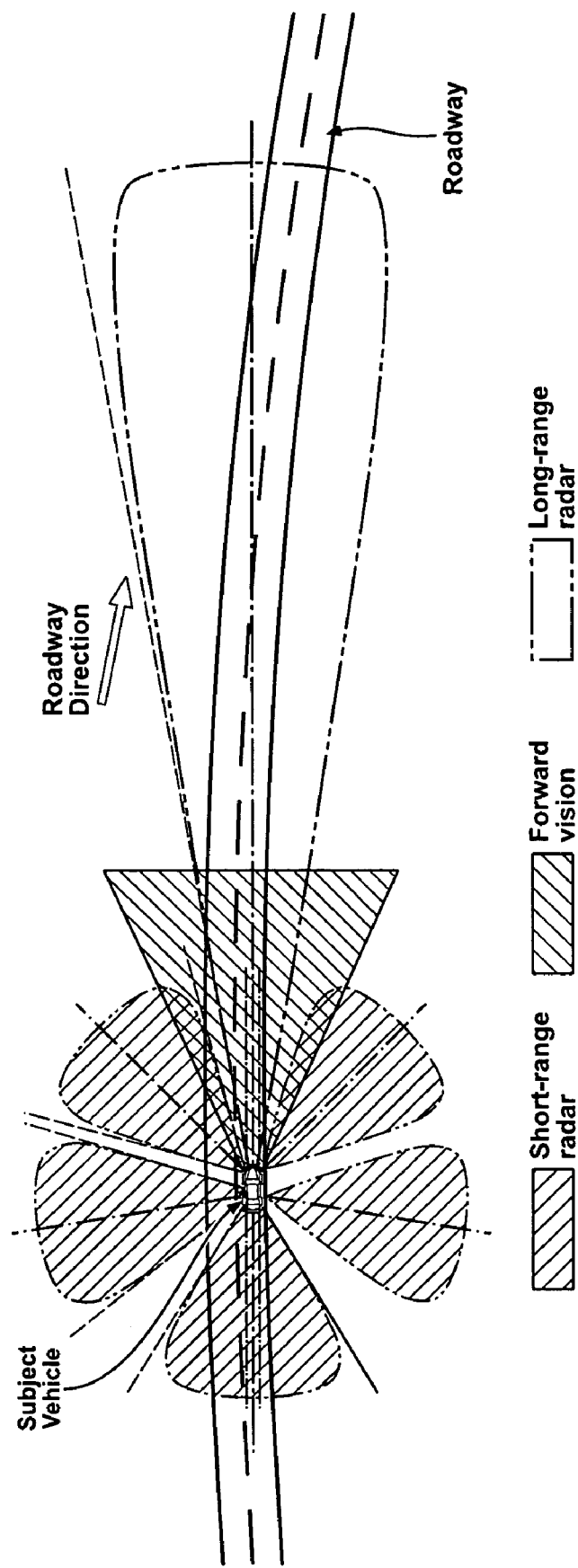
FIGS. 3 and 4 are schematic depictions of operation of an exemplary vehicle, in accordance with the present disclosure.

FIG. 3 shows a field of coverage for one embodiment of the aforementioned sensors 20, 20', 21, and 25 and camera 22 of the spatial monitoring system 16, including relative distance sensing scales for the sensors. One embodiment, covering more than 90% of the static area surrounding the subject vehicle 100, includes at least three sensors to monitor the lanes in front of and behind the subject vehicle 100. This redundancy in hardware coverage minimizes a risk of missing proximate approaching objects. Any gaps in reliable coverage are addressed using hysteresis in object tracking and during sensor fusion.

Figure 4:
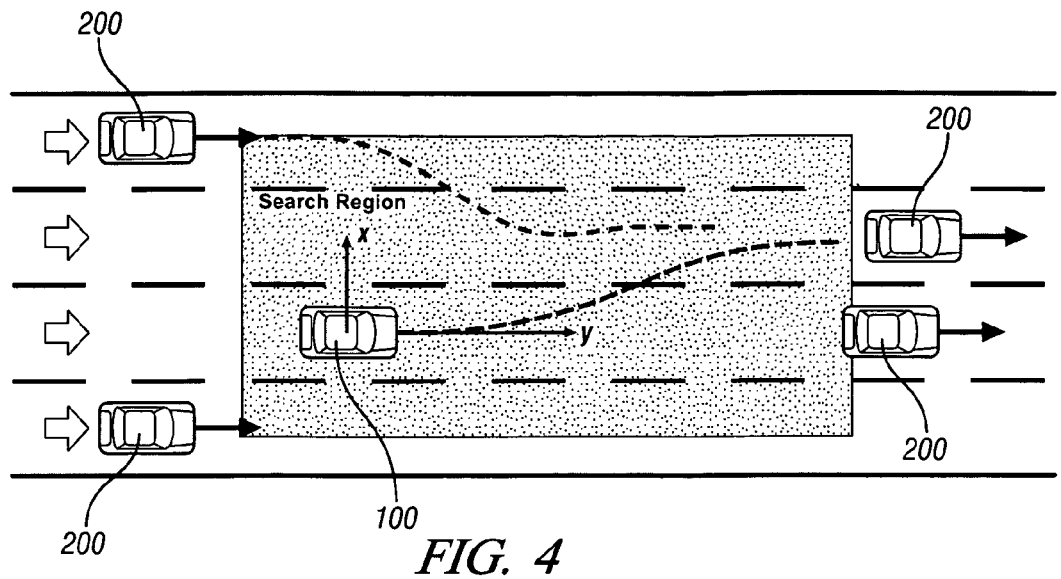

FIG. 4 schematically shows an exemplary search region for a subject vehicle 100 (SV). The spatial monitoring system 16 is capable of creating a digital image representation of an area around the subject vehicle 100. The data is translated into the XY-coordinate system referenced to the central axis of the subject vehicle 100 with the X-axis parallel to the longitudinal trajectory of the subject vehicle 100. An exemplary field of view for the vision subsystem associated with a lane change maneuver into a left lane is illustrated by the shaded area. A lane of travel on the road is depicted and describes the lane of travel of the object vehicle 200 and having common features, e.g., lane markers (not shown), that can be detected visually and utilized to describe lane geometry relative to subject vehicle 100.

In operation, the human machine interface control module 14 detects an operator input to execute a lane change maneuver and communicates it to the LXACC control module 30. The LXACC control module 30 sends the operating status, diagnosis message, and instruction message to the human-machine interface control module 14, which processes the request, including the collision risk assessment.

Figure 5:
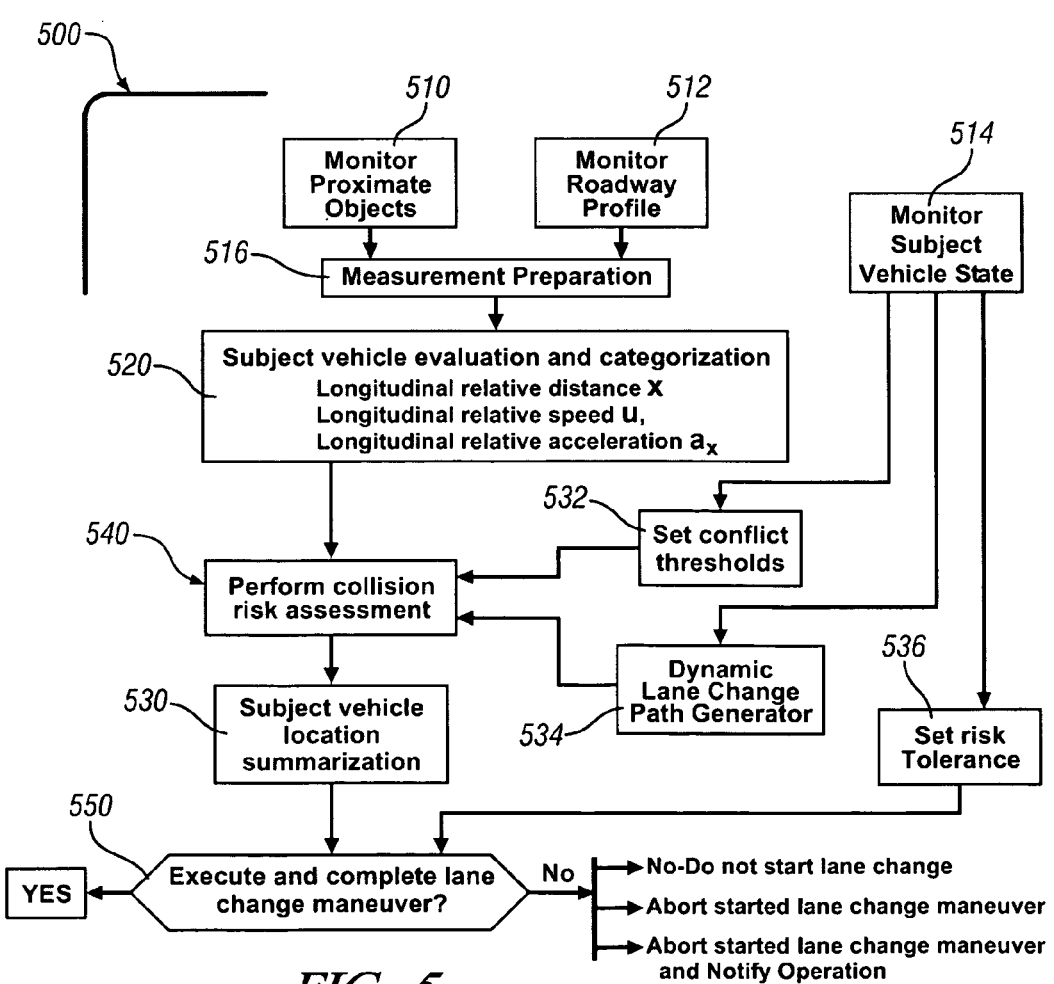
FIGS. 5, 5A and 6 are algorithmic flowcharts, in accordance with the present disclosure.

FIG. 5 shows a flowchart describing the collision risk assessment scheme 500 when the vehicle operator requests the subject vehicle 100 to execute a lane change maneuver from a current or host lane to a target lane during ongoing operation. The collision risk assessment process uses model predictive control (MPC) to predict the behavior of a modeled dynamic system, i.e., the object vehicle(s) 200, with respect to changes in the available measurements. A linear MPC approach is used with the feedback mechanism of the MPC compensating for prediction errors due to structural mismatch between the model and the process. The collision risk assessment scheme 500 uses near future information projected over a short period of time, six seconds in one embodiment, updated at intervals of 50 ms.

The collision risk assessment scheme 500 comprises a multi-tiered approach to assess a risk of collision during a lane change maneuver. The spatial monitoring system 16 monitors proximate objects, including each object vehicle(s) 200 proximate to the subject vehicle 100 (510) and monitors a roadway profile (512), the outputs of which are provided to a measurement preparation scheme (516), e.g., the fusion module 17 to perform a single object evaluation and categorization (520). The present state of the subject vehicle 100 is also monitored (514). The present state of the subject vehicle 100 can be used to determine and set conflict thresholds (532), generate a path for a dynamic lane change maneuver (534), and set risk tolerance rules (536).

The single object evaluation and categorization (520) is executed for each proximate object including object vehicle(s) 200 relative to the subject vehicle 100. This includes individually evaluating each object vehicle 200 using a time-base frame in a two-dimensional plane to project trajectories of the subject vehicle 100 and each object vehicle 200. The evaluation preferably includes the longitudinal relative distance x, the longitudinal relative speed u, and the longitudinal relative acceleration $a_x$ between the subject vehicle 100 and each object vehicle 200. Location(s) of the object vehicle(s) 200 are predicted relative to a projected trajectory of the subject vehicle 100 at future time-steps.

A collision risk assessment is performed (540) for each object vehicle(s) 200 associated with the single object evaluation and categorization (520) for object vehicle(s) 200 in view of the conflict thresholds and the path for the dynamic lane change maneuver. The collision risk assessment associated with each object vehicle(s) 200 is determined at each of the future time-steps. Performing the collision risk assessment preferably includes generating collision risk information that can be tabulated, e.g., as shown herein with reference to Table 1, below.

The collision risk assessment scheme 500 is based on projected relative trajectories that are determined by three main factors: projected behavior of the object vehicle(s) 200, road changes, and self-behavior of the subject vehicle 100. The location(s) of the object vehicle(s) 200 are predicted relative to a projected trajectory of the subject vehicle 100 at future time-steps. Projected relative trajectories are determined for the object vehicle(s) 200, including, e.g., projected speed profiles of each object vehicle(s) 200 indicating acceleration, slowing down, and hard braking during the period of time the lane change is being executed. The collision risk assessment scheme 500 includes monitoring and accommodating upcoming variations in the road, including lane split/merges, curvatures and banked road and a nonlinear desired trajectory of the subject vehicle 100 during the lane change.

The collision risk assessment is performed (540) for each object vehicle(s) 200 associated with the single object evaluation and categorization (520) for object vehicle(s) 200, location summarization of the subject vehicle 100 (530), the conflict threshold, the path for the dynamic lane change maneuver. Two criteria to assess collision risk are preferably used. The first criterion comprises a longitudinal projection, with the longitudinal, i.e., the X-axis defined as parallel to the trajectory of the subject vehicle 100. An object vehicle 200 is said to be a potential risk if it is determined to be longitudinally close, i.e., within an allowable margin, to the subject vehicle 100 in the next 6 seconds. A second order kinematics equation is used to determine allowable margins for the vehicle heading (front) and vehicle rear as follows.

$$\begin{cases} \dot{x} = u \\ \dot{u} = a_x \end{cases} \quad [1]$$

The term x is a longitudinal relative distance between the subject vehicle 100 and the object vehicle 200, the term u is the longitudinal relative speed between the subject vehicle 100 and the object vehicle 200 in units of meters per second, and the term $a_x$ is the longitudinal relative acceleration in units of meters per second per second. The relative distance, relative speed, and relative acceleration are defined between the subject vehicle 100 and each of the object vehicle(s) 200.

Allowable longitudinal margins comprising a heading margin and a rear margin are defined as follows to determine whether the subject vehicle 100 and each of the object vehicle(s) 200 are too close to each other, i.e., whether there is a collision risk. The heading margin is calculated as follows.

$$\text{Heading Margin} = \max(SVLonSpd * \tfrac{1}{2}, L\ m) \quad [2]$$

wherein SVLonSpd is the longitudinal speed of the subject vehicle 100. Specifically, the heading margin is the maximum value of the distance the subject vehicle 100 travels in 0.5 seconds (SVLonSpd*0.5) and a fixed distance of L meters. The fixed distance of L meters is 10 meters in one embodiment.

The rear margin is calculated as follows.

$$\text{Rear Margin} = \max(SVLonSpd * \tfrac{1}{3}, 8) \quad [3]$$

Specifically, the rear margin is the maximum value of the distance the subject vehicle 100 travels in 0.33 seconds (SVLonSpd*0.33) and a fixed distance of L2 meters. The fixed distance of L2 meters is 8 m in one embodiment.

The second criterion comprises a lateral projection of the object vehicle 200 with a lateral axis defined as being orthogonal to the trajectory of the subject vehicle 100 in the two-dimensional plane. The lateral offsets of targets are assumed to remain unchanged relative to the path of the lanes of travel. Here, the predicted relative lateral positions of the object vehicle 200 are subtracted from the projected future lateral displacements of the subject vehicle 100 along its desired lane change path, which is dynamically generated according to current vehicle status and steering input position.

A collision risk associated with the second criterion can be identified for an object vehicle 200 when the object vehicle 200 is laterally close to the subject vehicle 100 in the direction of the intended lane change, e.g., when the object vehicle 200 occupies the target lane of the subject vehicle 100. This is referred to as an occurrence of a lateral overlap. Roadway information can be used when objects on a curved road are mapped onto a straight road. The lateral offset of the subject vehicle 100 from lane center, subject vehicle orientation against lane direction and host lane curvature are updated every 50 ms.

A correct virtual reference of the surrounding environment is useful for correctly determining which lane the object vehicle(s) 200 is driving on. Thus, each step preferably includes a continuous transformation of the XY coordinate defined by the subject vehicle 100 and relative to the roadway surface, whether in a straight line or curved. In a lane change maneuver, the subject vehicle 100 moves across a lane marker, but the subject vehicle 100 may not be in the center of the lane, thus a change in the reference coordinate system is necessary for appropriate decision making. The origin and orientation of the subject vehicle 100 changes with time. Preferably the reference coordinate is placed at the center of the lane of travel of the subject vehicle 100 and with longitudinal axis Y aligned with the lane of travel. When measurements are made using the spatial monitoring system, relative coordinates of each object vehicle 200 can be tracked accordingly with geometric rotation and shift.

In terms of the accuracies of roadway measurements, $$\text{Curvature} \leq \text{Orientation (at } x=0) \leq \text{Lateral offset (at } x=0). \quad [4]$$

On-board measurement (x, y) is the relative position from sensors and object fusion. Orientation is defined as the angle starting from the x-axis to a tangent of path at the current position of the subject vehicle 100. The coordinate (x', y') is obtained by rotating at a center of gravity of the subject vehicle 100 and aligning longitudinal direction with the roadway. The origin is shifted back to a center of the present host lane in order to orient the coordinate (X,Y) in a virtual vehicle framework, where a virtual subject vehicle 100 is cruising along the centerline of the current lane at a current speed. The last step of preparation includes projecting object vehicle movement onto straight lanes parallel to the host lane. By doing so, the interactions between road complexity and target motion can be decoupled. The steering of all the moving vehicles due to road profile change is removed from their relative motion.

Figure 5A:
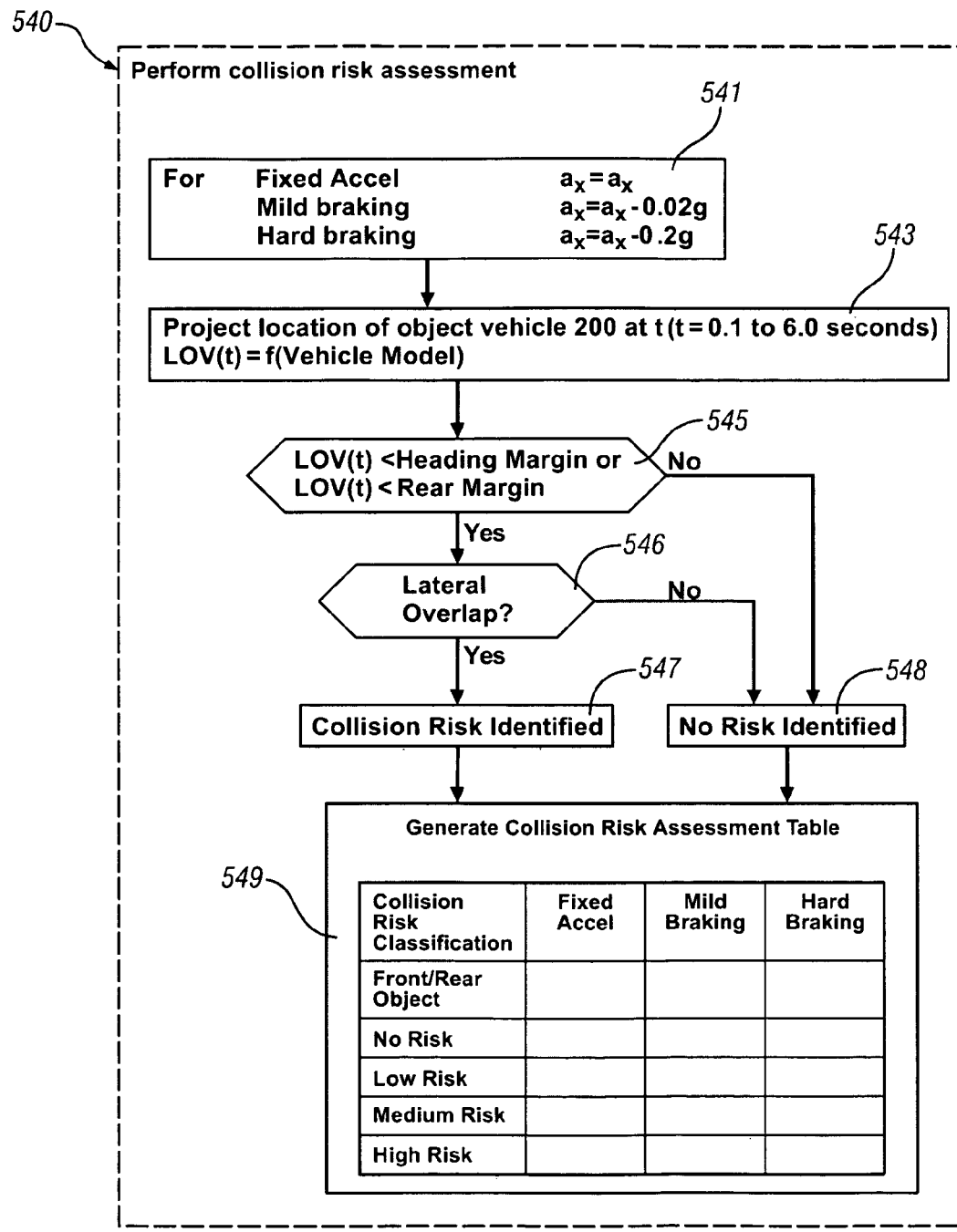

FIG. 5A shows an exemplary collision risk assessment process (540). Preferably, the LXACC control scheme 30 collects and analyzes data every 50 ms for each object vehicle 200 and calculates the heading and rear margins every 100 ms for each object vehicle 200. A range of potential operating behaviors of each object vehicle 200 are selected, comprising potential longitudinal acceleration rates in one embodiment. The selected longitudinal acceleration rates include a present acceleration rate, mild braking, and hard braking. Mild braking is defined as 0.02 g and hard braking is defined as 0.2 g in one embodiment (541). Other selected acceleration rates can be used depending upon vehicle dynamic capabilities. Location of each object vehicle 200 is projected and a longitudinal relative distance LOV(t) is projected between the subject vehicle 100 and each object vehicle(s) 200 based upon the present longitudinal distance x, the longitudinal relative speed u and the longitudinal relative acceleration ax under three sets of conditions for acceleration, for time periods projecting into the future from 100 ms to 6.0 seconds at 100 ms intervals based upon a predetermined vehicle model (543). One exemplary kinematic vehicle model is set forth as follows.

$$LOV(t) = x + u^*(t) + 0.5 a_x^*(t)^2 \quad [5]$$

The projected longitudinal relative distance LOV(t) for each of the time periods for each set of acceleration conditions is compared to the heading margin and the rear margin to detect any longitudinal overlap with the heading margin or the rear margin in the forthcoming six seconds (545). When a risk of longitudinal overlap is identified, it is evaluated whether there is a lateral overlap (546). A risk of collision with each object vehicle 200 is identified when the projected longitudinal relative distance LOV(t) is within one of the heading margin and the rear margin in the forthcoming six seconds and there is lateral overlap (547). The criteria of classification are mirrored for front objects and rear objects because the same braking effort has different effects on front object vehicles and rear object vehicles in terms of relative distances. Risk assessment includes classifying the risk of collision as one of no risk, low risk, medium risk and high risk.

There is said to be no risk of collision when there is no combination of longitudinal overlap between one of the heading margin and the rear margin and the projected longitudinal relative distance LOV(t) and no lateral overlap, as evaluated for each of the time periods for each set of acceleration conditions comprising fixed acceleration, mild braking and hard braking. There is said to be a low risk of collision when there is a combination of lateral overlap and longitudinal overlap between one of the heading margin and the rear margin and the projected longitudinal relative distance LOV(t) for any of the time periods only when the acceleration conditions comprise hard braking.

There is said to be a medium risk of collision when there is a combination of lateral overlap and longitudinal overlap between one of the heading margin and the rear margin and the projected longitudinal relative distance LOV(t) for any of the time periods when the acceleration conditions include mild braking and hard braking.

There is said to be a high risk of collision when there is a combination of lateral overlap and longitudinal overlap between one of the heading margin and the rear margin and the projected longitudinal relative distance LOV(t) for any of the time periods under any of the acceleration conditions.

An exemplary collision risk assessment table (549) is shown in Table 1:

TABLE 1

| | Object vehicle 200 | | |
| --- | --- | --- | --- |
| Risk of Collision | Fixed Acceleration | Mild Braking (−0.02 g) | Hard Braking (−0.2 g) |
| Front Object | | | |
| No Risk | -No- | -No- | -No- |
| Low Risk | -No- | -No- | -Yes- |
| Medium Risk | -No- | -Yes- | -Yes- |
| High Risk | -Yes- | -Yes- | -Yes |
| Rear Object | | | |
| No Risk | -No- | -No- | -No- |
| Low Risk | -Yes- | -No- | -No- |
| Medium Risk | -Yes- | -Yes- | -No- |
| High Risk | -Yes- | -Yes- | -Yes- | wherein -Yes- indicates there is a risk of a collision in the next 6 seconds, and -No- indicates no risk of a collision in the next 6 seconds.

A location summarization of the subject vehicle 100 is then determined (530). Preferably, the surrounding location of the subject vehicle 100 is divided into six areas, including a front host lane, middle host lane, rear host lane, front target lane, side target lane, and rear target lane. A single metric for level of collision risk is used for the six areas to summarize all single object categories. The resulting six metrics become relatively more robust with respect to object detection. For example, when one object vehicle 200 cuts in the front target lane from a merging ramp while another object vehicle 200 leaves to exit the highway at the same time, the location metric will not become on and off. This will help prevent undesirably sending out temporary road availability. Regardless of the quantity of valid object vehicle(s) 200 and other proximate objects proximate, the risk assessment for each of the areas is ongoingly determined.

Setting the risk tolerance rules includes determining for the subject vehicle 100 whether a lane change maneuver has been requested, whether a lane change maneuver has started, and whether a lane boundary has been crossed subsequent to requesting and initiating the lane change maneuver. One of a conservative risk tolerance, a moderate risk tolerance, and an aggressive risk tolerance is selected accordingly (536).

The lane change control decision-making comprises granting or denying permission to execute and/or complete the requested lane change maneuver in response to the collision risk assessment in view of the risk tolerance rules (550). Permission for the subject vehicle 100 to start and/or complete a requested lane change maneuver is granted or denied based upon the collision risk assessment and risk tolerance rules. The collision risk assessment scheme preferably executes ongoingly during vehicle operation, including before and during execution of an autonomic lane change maneuver until completion thereof, taking into account the trajectory of the subject vehicle 100.

Thus, subsequent to commanding a lane change maneuver, it is determined whether a lane change has started and whether a lane boundary has been crossed. One of the conservative risk tolerance, the moderate risk tolerance, and the aggressive risk tolerance is selected based thereon (536). The conservative risk tolerance permits execution of the requested lane change maneuver only when there has been no collision risk in the most recent 0.3 seconds. The moderate risk tolerance permits execution of the requested lane change maneuver only when the collision risk is low or no risk. The aggressive risk tolerance permits execution of the requested lane change maneuver only when the collision risk is medium or less. The collision risk assessment is performed (540) for each 100 ms period projecting 6 seconds into the future for each object vehicle 200 within a field of view of the subject vehicle 100 in one embodiment, and the appropriate risk tolerance is applied to each assessment corresponding to whether a lane change has started, and whether a lane boundary has been crossed. Potential outcomes of the collision risk assessment control scheme (500) include permitting the lane change maneuver, inhibiting the lane change maneuver or warning the operator prior to starting the lane change maneuver, aborting the started lane change maneuver and returning to the original lane, and aborting the started lane change maneuver and notifying and demanding operator action.

Figure 6:
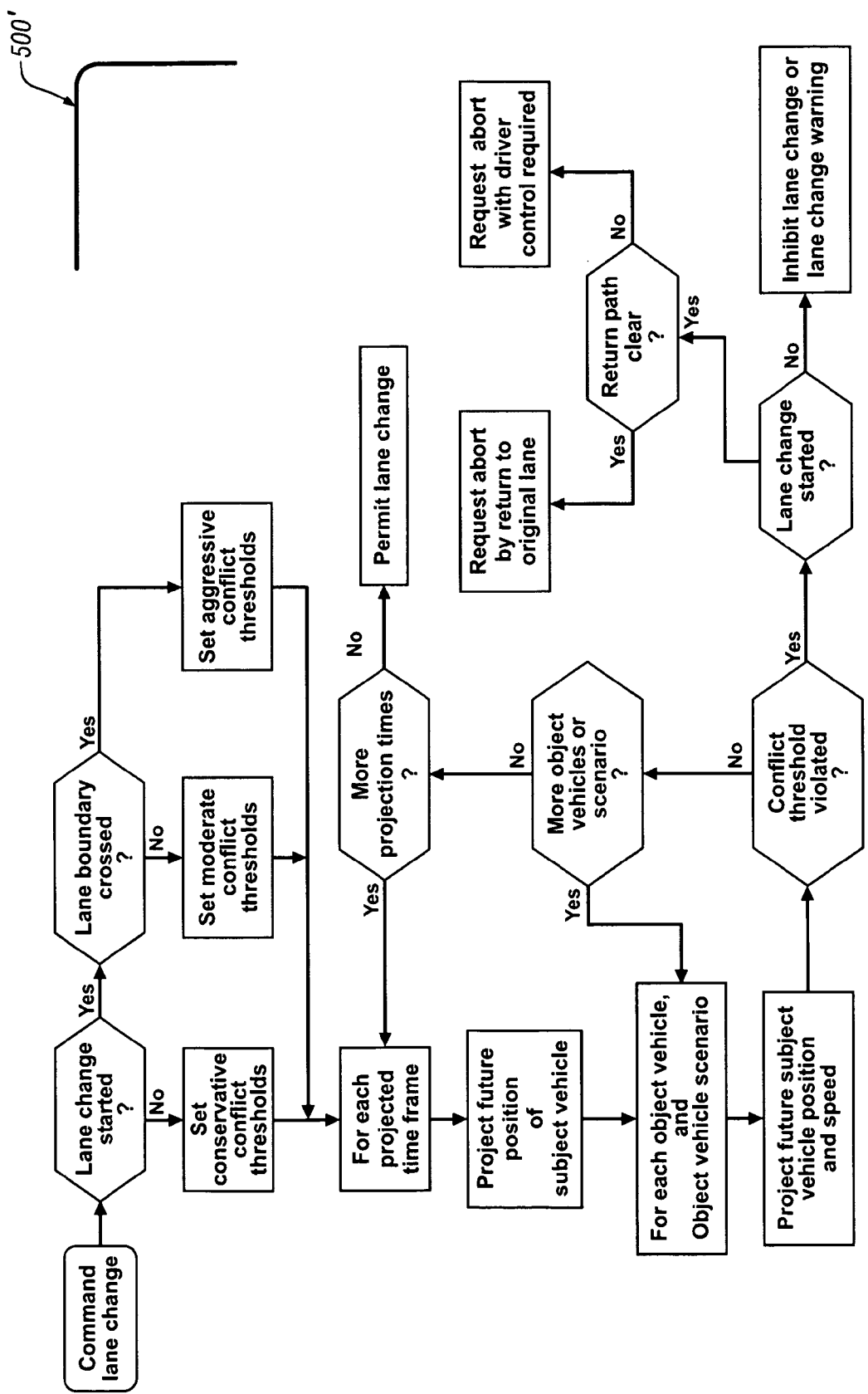

FIG. 6 depicts an embodiment of the exemplary control scheme 500' executed by the LXACC system 30 to execute and apply collision risk assessment before and during a lane change maneuver, using the collision risk classification depicted in Table 1. Lane change decision-making comprises permission to execute and/or complete a lane change maneuver, and is associated with the collision risk assessment and the location summarization of the subject vehicle 100.

In operation, the collision risk assessment scheme 500' analyzes the lane and traffic information and compares them with the desired lane change path predicted constantly based on the status and location of the subject vehicle 100. If a collision is predicted when a lane change is requested, the maneuver will be on hold temporarily until the related lanes are empty or have enough spatial safety margins to carry out this action. If a collision is predicted during the lane change, the maneuvering will have two options of aborting action, which depends on the then current situation. The LXACC system 30 forces the vehicle go back to its original lane whenever this can be done safely; otherwise the lane change is aborted and control is yielded to the vehicle operator.

FIGS. 7A and 7B schematically illustrate a roadway including a subject vehicle 100 and an object vehicle 200 over time during execution of a lane change maneuver in accordance with the collision risk assessment scheme 500 described herein. Integers 1, 2, 3, 4, 5, and 6 indicate elapsed time in seconds and the vehicles indicate locations of the subject vehicle 100 and object vehicle 200 at corresponding points in time. FIG. 7A shows the subject vehicle 100 occupies a location after 4 seconds, and the object vehicle 200 occupies the same location after 6 seconds. The collision risk assessment scheme indicates a permissible lane change maneuver. FIG. 7B shows the subject vehicle 100 occupies a location after 4 seconds, and the object vehicle 200 occupies the same location after 5 seconds. The collision risk assessment scheme does not indicate a permissible lane change maneuver, and causes the LXACC system 30 to stop or abort the lane change maneuver.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for assessing a risk of collision associated with operation of a subject vehicle including a spatial monitoring system, the subject vehicle configured to execute an autonomic lane change maneuver, comprising:
    monitoring a plurality of object vehicles located proximate to the subject vehicle;
    predicting locations of the object vehicles relative to a projected trajectory of the subject vehicle at future time-steps including estimating a longitudinal distance, longitudinal speed, and longitudinal acceleration of each object vehicle relative to the subject vehicle and projecting a longitudinal relative distance between the subject vehicle and each object vehicle for elapsed time periods corresponding to the future time-steps associated with the longitudinal distance, longitudinal speed, and longitudinal acceleration of the object vehicle relative to the subject vehicle;
    determining lateral overlaps between the subject vehicle and the object vehicles;
    predicting potential operating behaviors of the object vehicles;
    predicting locations of the object vehicles relative to a projected trajectory of the subject vehicle and associated with the potential operating behaviors at the future time-steps;

assessing a collision risk level between the subject vehicle and the object vehicles at the future time-steps based upon the lateral overlaps and comparisons between the longitudinal relative distances and an allowable margin associated with the predicted locations of the object vehicles, the allowable margin comprising a heading margin and a rear margin determined relative to a longitudinal axis parallel to the trajectory of the subject vehicle;

initiating an autonomic lane change maneuver in response to a lane change maneuver request and setting a risk tolerance associated therewith; and granting permission to execute and complete the autonomic lane change maneuver in response to the risk tolerance and the collision risk level;

wherein assessing the collision risk level between the subject vehicle and the object vehicles at the future time-steps based upon the lateral overlaps and the comparisons between the longitudinal relative distances and said allowable margin associated with the predicted locations of the object vehicles comprises assessing there to be no collision risk level when there is no combination of longitudinal overlap between the longitudinal relative distances and the allowable margin and no lateral overlap at the future time-steps for the potential operating behaviors, the potential operating behaviors comprising acceleration conditions comprising fixed acceleration, mild braking and hard braking of the object vehicles.

2. The method of claim 1, wherein the risk tolerance comprises one of a conservative risk, a moderate risk, and an aggressive risk corresponding to whether said lane change maneuver has been requested, whether said lane change maneuver has started, and whether said lane boundary has been crossed subsequent to initiating the autonomic lane change maneuver, respectively.

3. The method of claim 1, wherein predicting potential operating behaviors of the object vehicles comprises predicting operating behaviors comprising selected longitudinal acceleration rates for the selected object vehicle; and wherein assessing the collision risk level between the subject vehicle and the selected object vehicle at the future time-steps associated with the predicted locations of the selected object vehicle comprises assessing the collision risk level between the subject vehicle and the selected object vehicle at the future time-steps associated with each of the selected longitudinal acceleration rates.

4. The method of claim 1, wherein predicting locations of the object vehicles relative to a projected trajectory of the subject vehicle at future time-steps including estimating a longitudinal distance, longitudinal speed, and longitudinal acceleration of each object vehicle relative to the subject vehicle comprises:

predicting operating behaviors comprising selected longitudinal acceleration rates of each object vehicle; and projecting a longitudinal relative distance between the subject vehicle and each object vehicle for elapsed time periods corresponding to the future time-steps associated with the longitudinal distance, longitudinal speed, and the selected longitudinal acceleration of each object vehicle relative to the subject vehicle.

5. The method of claim 4, wherein the selected longitudinal acceleration of each object vehicle includes a present acceleration rate, a mild vehicle braking rate, and a hard vehicle braking rate.

6. The method of claim 2, wherein granting permission to execute and complete the autonomic lane change maneuver in response to the risk tolerance and the assessed collision risk level between the subject vehicle and the monitored object vehicles comprises granting permission to execute and complete the autonomic lane change maneuver only when the risk tolerance comprises the conservative risk tolerance and when there has been no collision risk in the most recent 0.3 seconds.

7. The method of claim 2, wherein granting permission to execute and complete the autonomic lane change maneuver in response to the risk tolerance and the assessed collision risk level between the subject vehicle and the monitored object vehicles comprises granting permission to execute and complete the autonomic lane change maneuver only when the risk tolerance comprises the moderate risk tolerance and when the collision risk is one of a low risk and no risk.

8. The method of claim 2, wherein granting permission to execute and complete the autonomic lane change maneuver in response to the risk tolerance and the assessed collision risk level between the subject vehicle and the monitored object vehicles comprises granting permission to execute and complete the autonomic lane change maneuver only when the risk tolerance comprises the aggressive risk tolerance and when the collision risk is a medium risk or less.

9. The method of claim 2, wherein assessing the collision risk level between the subject vehicle and the object vehicles comprises assessing collision risk levels in a front host lane, a rear host lane, a front target lane, a side target lane, and a rear target lane.

10. Method for assessing a risk of collision associated with operation of a subject vehicle including a spatial monitoring system, the subject vehicle configured to execute an autonomic lane change maneuver, comprising:

monitoring a plurality of object vehicles located proximate to the subject vehicle;

predicting locations of the object vehicles relative to a projected trajectory of the subject vehicle at future time-steps including estimating a longitudinal distance, longitudinal speed, and longitudinal acceleration of each object vehicle relative to the subject vehicle and projecting a longitudinal relative distance between the subject vehicle and each object vehicle for elapsed time periods corresponding to the future time-steps associated with the longitudinal distance, longitudinal speed, and longitudinal acceleration of the object vehicle relative to the subject vehicle;

determining lateral overlaps between the subject vehicle and the object vehicles;

predicting potential operating behaviors of the object vehicles;

predicting locations of the object vehicles relative to a projected trajectory of the subject vehicle and associated with the potential operating behaviors at the future time-steps;

assessing a collision risk level between the subject vehicle and the object vehicles at the future time-steps based upon the lateral overlaps and comparisons between the longitudinal relative distances and an allowable margin associated with the predicted locations of the object vehicles, the allowable margin comprising a heading margin and a rear margin determined relative to a longitudinal axis parallel to the trajectory of the subject vehicle;

initiating an autonomic lane change maneuver in response to a lane change maneuver request and setting a risk tolerance associated therewith; and granting permission to execute and complete the autonomic lane change maneuver in response to the risk tolerance and the collision risk level;

wherein assessing the collision risk level between the subject vehicle and the object vehicles at the future time-steps based upon the lateral overlaps and the comparisons between the longitudinal relative distances and said allowable margin associated with the predicted locations of the object vehicles comprises assessing there to be a low collision risk level when there is a combination of longitudinal overlap between the longitudinal relative distances and the allowable margin and a lateral overlap at the future time-steps when the potential operating behavior comprises an acceleration condition comprising hard braking of one of the object vehicles.

11. Method for assessing a risk of collision associated with operation of a subject vehicle including a spatial monitoring system, the subject vehicle configured to execute an autonomic lane change maneuver, comprising:
monitoring a plurality of object vehicles located proximate to the subject vehicle;
predicting locations of the object vehicles relative to a projected trajectory of the subject vehicle at future time-steps including estimating a longitudinal distance, longitudinal speed, and longitudinal acceleration of each object vehicle relative to the subject vehicle and projecting a longitudinal relative distance between the subject vehicle and each object vehicle for elapsed time periods corresponding to the future time-steps associated with the longitudinal distance, longitudinal speed, and longitudinal acceleration of the object vehicle relative to the subject vehicle;
determining lateral overlaps between the subject vehicle and the object vehicles;
predicting potential operating behaviors of the object vehicles;
predicting locations of the object vehicles relative to a projected trajectory of the subject vehicle and associated with the potential operating behaviors at the future time-steps;
assessing a collision risk level between the subject vehicle and the object vehicles at the future time-steps based upon the lateral overlaps and comparisons between the longitudinal relative distances and an allowable margin associated with the predicted locations of the object vehicles, the allowable margin comprising a heading margin and a rear margin determined relative to a longitudinal axis parallel to the trajectory of the subject vehicle;
initiating an autonomic lane change maneuver in response to a lane change maneuver request and setting a risk tolerance associated therewith; and
granting permission to execute and complete the autonomic lane change maneuver in response to the risk tolerance and the collision risk level;
wherein assessing the collision risk level between the subject vehicle and the object vehicles at the future time-steps based upon the lateral overlaps and the comparisons between the longitudinal relative distances and said allowable margin associated with the predicted locations of the object vehicles comprises assessing there to be a medium collision risk level when there is a combination of longitudinal overlap between the longitudinal relative distances and the allowable margin and a lateral overlap at the future time-steps when the potential operating behavior comprises an acceleration condition comprising one of mild braking and hard braking of one of the object vehicles.

12. Method for assessing a risk of collision associated with operation of a subject vehicle including a spatial monitoring system, the subject vehicle configured to execute an autonomic lane change maneuver, comprising:
monitoring a plurality of object vehicles located proximate to the subject vehicle;
predicting locations of the object vehicles relative to a projected trajectory of the subject vehicle at future time-steps including estimating a longitudinal distance, longitudinal speed, and longitudinal acceleration of each object vehicle relative to the subject vehicle and projecting a longitudinal relative distance between the subject vehicle and each object vehicle for elapsed time periods corresponding to the future time-steps associated with the longitudinal distance, longitudinal speed, and longitudinal acceleration of the object vehicle relative to the subject vehicle;
determining lateral overlaps between the subject vehicle and the object vehicles;
predicting potential operating behaviors of the object vehicles;
predicting locations of the object vehicles relative to a projected trajectory of the subject vehicle and associated with the potential operating behaviors at the future time-steps;
assessing a collision risk level between the subject vehicle and the object vehicles at the future time-steps based upon the lateral overlaps and comparisons between the longitudinal relative distances and an allowable margin associated with the predicted locations of the object vehicles, the allowable margin comprising a heading margin and a rear margin determined relative to a longitudinal axis parallel to the trajectory of the subject vehicle;
initiating an autonomic lane change maneuver in response to a lane change maneuver request and setting a risk tolerance associated therewith; and
granting permission to execute and complete the autonomic lane change maneuver in response to the risk tolerance and the collision risk level;
wherein assessing the collision risk level between the subject vehicle and the object vehicles at the future time-steps based upon the lateral overlaps and the comparisons between the longitudinal relative distances and said allowable margin associated with the predicted locations of the object vehicles comprises assessing there to be a high collision risk level when there is a combination of longitudinal overlap between the longitudinal relative distances and the allowable margin and a lateral overlap at the future time-steps when the potential operating behavior comprises an acceleration condition comprising one of fixed acceleration, mild braking and hard braking of one of the object vehicles.

* * * * *